United States Patent
Kim

(10) Patent No.: US 9,696,174 B2
(45) Date of Patent: Jul. 4, 2017

(54) SYSTEM AND METHOD FOR PROVIDING SURROUNDING AREA SEARCH RESULT

(71) Applicant: Thinkware Systems Corporation, Seongnam-si, Gyeonggi-do (KR)

(72) Inventor: Yeon Jung Kim, Seongnam-si (KR)

(73) Assignee: Thinkware Systems Corporation, Seongnam-si (KR)

( * ) Notice: Subject to any disclaimer, the term of this patent is extended or adjusted under 35 U.S.C. 154(b) by 44 days.

(21) Appl. No.: 14/309,477

(22) Filed: Jun. 19, 2014

(65) Prior Publication Data

US 2015/0039227 A1 Feb. 5, 2015

(30) Foreign Application Priority Data

Jul. 31, 2013 (KR) .................. 10-2013-0091092

(51) Int. Cl.
*G01C 21/36* (2006.01)
(52) U.S. Cl.
CPC ............................... *G01C 21/3682* (2013.01)
(58) Field of Classification Search
CPC ............ G01C 21/3682; G01C 21/3679; G08G 1/0962; G08G 1/096894; G08G 1/096827; H04L 67/18; H04W 4/02

USPC ................ 701/426, 468, 532–533; 340/990; 342/357.31

See application file for complete search history.

(56) References Cited

U.S. PATENT DOCUMENTS

| 7,082,365 B2 * | 7/2006 | Sheha ............. G01C 21/3679 340/990 |
| 8,433,512 B1 * | 4/2013 | Lopatenko ......... G01C 21/20 701/400 |
| 8,810,437 B2 * | 8/2014 | Beyeler ........... G01C 21/3682 340/995.1 |

* cited by examiner

*Primary Examiner* — Nga X Nguyen
(74) *Attorney, Agent, or Firm* — Fenwick & West LLP

(57) ABSTRACT

Provided is a system and method for providing a surrounding area search result. A search system may include a searcher configured to search for a reference location in response to a nearby point of interest (POI) search request based on the reference location, and to search for POIs located around the reference location, and a display configured to display a search result about the POIs based on each reference location when at least two reference locations are retrieved.

9 Claims, 5 Drawing Sheets

SYSTEM AND METHOD FOR PROVIDING SURROUNDING AREA SEARCH RESULT

CROSS-REFERENCE TO RELATED APPLICATION

This application claims the priority benefit of Korean Patent Application No. 10-2013-0091092, filed on Jul. 31, 2013, in the Korean Intellectual Property Office, the disclosure of which is incorporated herein by reference.

BACKGROUND

1. Field of the Invention

Embodiments of the present invention relate to a system and method for providing a search result obtained by searching a surrounding area based on a reference location.

2. Description of the Related Art

Currently, with the development in information technology, a geographic information system (GIS) in which various types of geographic information is provided in a database has been widely used. Location information, such as latitude, longitude, and an address, may be easily retrieved through the GIS.

In general, the GIS may collect geographic data from, for example, a public institution and a geographic information server, may convert the geographic data to an appropriate map formatted image, and may provide the converted map formatted image to a user.

Meanwhile, a navigation system refers to a system configured to provide information for driving of a transportation device, such as a vehicle, using an artificial satellite. The navigation system may include a global positioning system (GPS) receiver to receive predetermined data from a GPS satellite orbiting around the earth, and to calculate a location of the navigation system based on the received data.

The navigation system may provide a variety of services, such as a location service for notifying a user about a current location of a vehicle, a routing service for calculating an optimal path to a desired destination, and a guidance service for guiding the vehicle along the calculated path.

The GIS and the navigation system may provide a surrounding area search function for searching for points of interest (POIs) located around a predetermined location, for example, a reference location. For example, Korean Patent No. 10-0948773 discloses a technology for searching for POIs of a predetermined item located around a path between a departure and a destination.

For example, referring to FIG. 1, when searching for "gasoline station" located around "Central Market", "Central Market" in Seoul becomes a reference location and gasoline stations located around the reference location are provided as a search result 100.

However, when "Central Market" is retrieved at a plurality of locations as a search result, an issue may arise in a process of selecting a reference location. As a matter of fact, POIs with the name of "Central Market" are present at a plurality of locations, for example, "Hwanghak-dong, Jung-gu, Seoul" and "Taepeong-dong, Wansan-gu, Jeonju".

As described above, when a plurality of reference locations is retrieved, a reference location located nearest to a current location of a vehicle may be selected. Alternatively, a famous POI or a predetermined POI may be selected as a reference location. That is, a search result about POIs based on a single reference location may be provided by determining a single reference location from among the plurality of reference locations.

Since a POI is retrieved based on a single reference location, a search may, frequently, not be conducted at a reference location desired by a user. Accordingly, it may not be possible to guarantee the accuracy and the reliability of a surrounding area search result.

SUMMARY

An aspect of the present invention provides a system and method that may improve the performance of a surrounding area search function of searching for a point of interest (POI) located around a predetermined location, for example, a reference location.

An aspect of the present invention also provides a system and method that may group and thereby display a search result into a plurality of groups based on each reference location when a POI corresponding to a reference location is retrieved at a plurality of locations as a search result.

According to an aspect of the present invention, there is provided a search system, including a searcher configured to search for a reference location in response to a nearby POI search request based on the reference location, and to search for POIs located around the reference location, and a display configured to display a search result about the POIs based on each reference location when at least two reference locations are retrieved.

The display may group and thereby display the search result into a plurality of groups based on each reference location.

The display may group and thereby display the search result into a plurality of groups based on each reference location, and may apply, to each group, a display ranking determined based on each reference location and thereby display the search result.

The display ranking of the reference location may be determined based on a distance between the reference location and a current location of a user terminal having requested a nearby POI search.

The display ranking of the reference location may be determined based on a weight according to a type of a POI corresponding to the reference location.

The display ranking of the reference location may be determined based on a weight according to an awareness level of a POI corresponding to the reference location.

The display may initially display a reference location list and may display a search result list about a POI corresponding to a reference location selected from the reference location list.

A display ranking of each reference location included in the reference location list may be determined based on one of a distance between the reference location and a current location of a user terminal having requested a nearby POI search, a weight according to a type of a POI corresponding to the reference location, and a weight according to an awareness level of the POI corresponding to the reference location.

According to another aspect of the present invention, there is provided a search system, including a transceiver configured to transmit, to a search server, a nearby POI search request based on a reference location, and to receive, from the search server, a search result about the nearby POI search request; and a display configured to display the search result about the nearby POI search request. The search server may be configured to search for the reference location, to search for POIs located around the reference location, and to group and thereby provide a search result about the POIs into a plurality of groups based on each reference location when at least two reference locations are retrieved.

The display may be configured to display the search result about the nearby POI search request into the plurality of groups based on the reference location. A display ranking of the reference location may be determined based on one of a distance between the reference location and a current location of a user terminal having requested a nearby POI search, a weight according to a type of a POI corresponding to the reference location, and a weight according to an awareness level of the POI corresponding to the reference location.

According to still another aspect of the present invention, there is provided a search method, including searching for a reference location in response to a nearby POI search request based on the reference location, and searching for POIs located around the reference location, and displaying a search result about the POIs based on each reference location when at least two reference locations are retrieved.

According to still another aspect of the present invention, there is provided a search method, including transmitting, to a search server, a nearby point of interest (POI) search request based on a reference location, receiving, from the search server, a search result about the nearby POI search request, and displaying the search result about the nearby POI search request. The search server may search for the reference location, to search for POIs located around the reference location, and to group and thereby provide the search result about the POIs into a plurality of groups based on each reference location when at least two reference locations are retrieved.

EFFECT

According to embodiments of the present invention, when a point of interest (POI) corresponding to a reference location is retrieved at a plurality of locations as a result of conducting a surrounding area search, the search result may be grouped into a plurality of groups based on each reference location and thereby displayed. Accordingly, when selecting a reference location, a surrounding area search may be conducted at all the reference locations without a POI omission. Accordingly, it is possible to improve the performance of a surrounding area search function of searching for a POI located around a predetermined location, for example, a reference location, and to provide a further accurate surrounding area search result.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
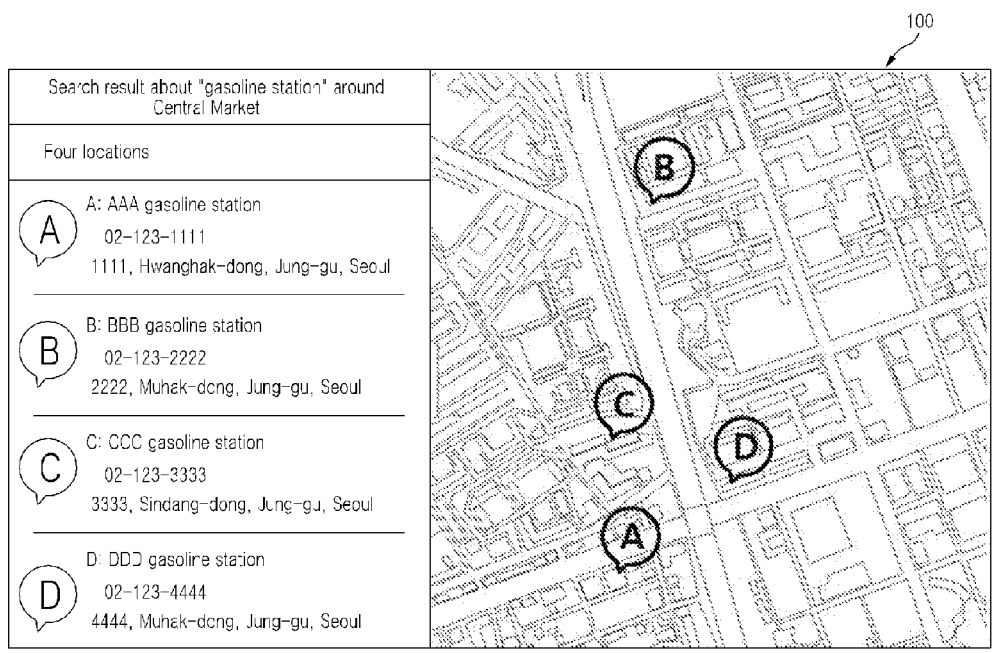
FIG. 1 illustrates a screen showing a surrounding area search result according to the related art.

Reference will now be made in detail to embodiments of the present invention, examples of which are illustrated in the accompanying drawings, wherein like reference numerals refer to the like elements throughout. Embodiments are described below to explain the present invention by referring to the figures.

Embodiments may be applied to a system for providing a map search service and, in particular, may be applied to a search system for searching for a nearby point of interest (POI) based on a predetermined location, for example, a reference location. Here, the nearby POI refers to a POI located around the reference location.

The term "reference location" used herein may refer to actual or virtual information present on a map and thus, may indicate a predetermined POI that is a reference point used to search for various POIs matching on the map.

Figure 2:
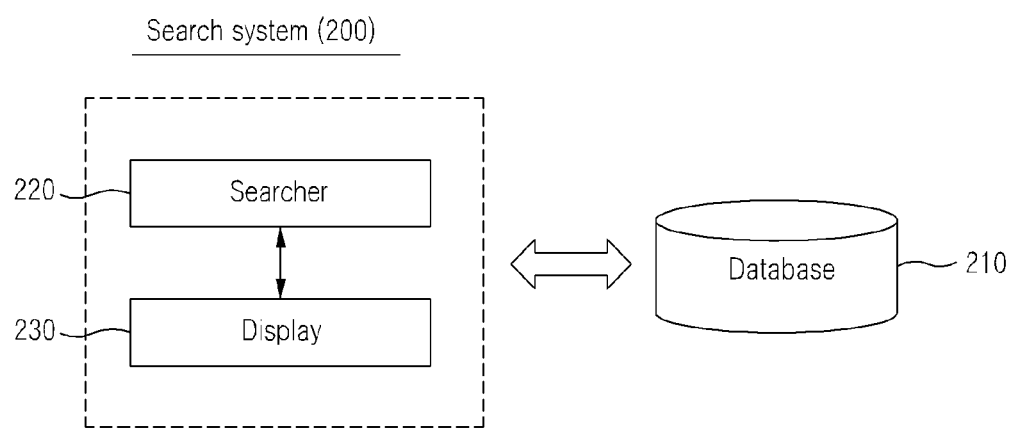
FIG. 2 is a block diagram illustrating a configuration of a search system for providing a surrounding area search result based on a plurality of reference locations according to one embodiment.

FIG. 2 is a block diagram illustrating a configuration of a search system 200 for providing a surrounding area search result based on a plurality of reference locations according to one embodiment.

Referring to FIG. 2, the search system 200 may include a database 210, a searcher 220, and a display 230.

The search system 200 may be configured on a server system configured to provide a map search service to a service user in a web environment or a mobile environment, or may be configured on a terminal device capable of conducting a map search, for example, a personal computer (PC), a laptop computer, a navigation device, a smartphone, a tablet, and a digital broadcasting terminal, and a portable multimedia player (PMP).

The database 210 may refer to a storage system configured to store and maintain all the map data displayed on a map. In the map data, a POI refers to data in which a primary facility to be displayed on a map screen is displayed on an electronic numerical map, and may include text information, for example, a name, an address, and a telephone number.

As an example, the database 210 may divide a map into regularly sized grids, may store map data for each grid, and may assign an index to each grid. According to the above configuration, it is possible to conduct a map data search for each index using a grid-based index.

The database 210 may be configured as an internal configuration of the search system 200, or may be configured in a cloud system form on the Internet and thereby be configured as an individual resource system that interacts with the search system 200.

The searcher 220 may serve to search for POIs located around a reference location in response to a search query. To this end, the searcher 220 may identify a keyword for searching for the reference location and may identify a keyword for searching for a POI from the search query. For example, in response to search keyword "Central Market gasoline station" or "gasoline station around Central Market" input from a user, "gasoline station" located around "Central Market" may be set as a search condition by designating "Central Market" as a reference location and by designating "gasoline station" as a POI to be retrieved. Accordingly, in response to a nearby POI search request based on the reference location, the searcher 220 may search for the reference location, for example, "Central Market"

and then may search for POIs, for example, "gasoline stations" located within a predetermined distance, for example, 2 km from the retrieved reference location.

When searching for a reference location using a keyword, at least two reference locations may be retrieved due to the similarity or identity between names of POIs. In the present embodiment, when at least two reference locations are retrieved, the searcher 220 may search for a nearby POI for each reference location with respect to all of the at least two reference locations, instead of selecting a single reference location.

The display 230 may display a surrounding area search result obtained by the searcher 220 to be verifiable by the user. In this example, a result screen displayed according to a surrounding area search function may include a list screen showing information on a nearby POI, included in the search result, for example, a name, a telephone number, and an address, based on a text and a map screen showing a location of a nearby POI included in the search result in a variety of view modes, for example, a street view and an aviation view, on the map (see FIG. 1).

When at least two reference locations are retrieved, the display 230 may display, on the list screen, a search result about nearby POIs of each reference location, with respect to each reference location.

Figure 3:
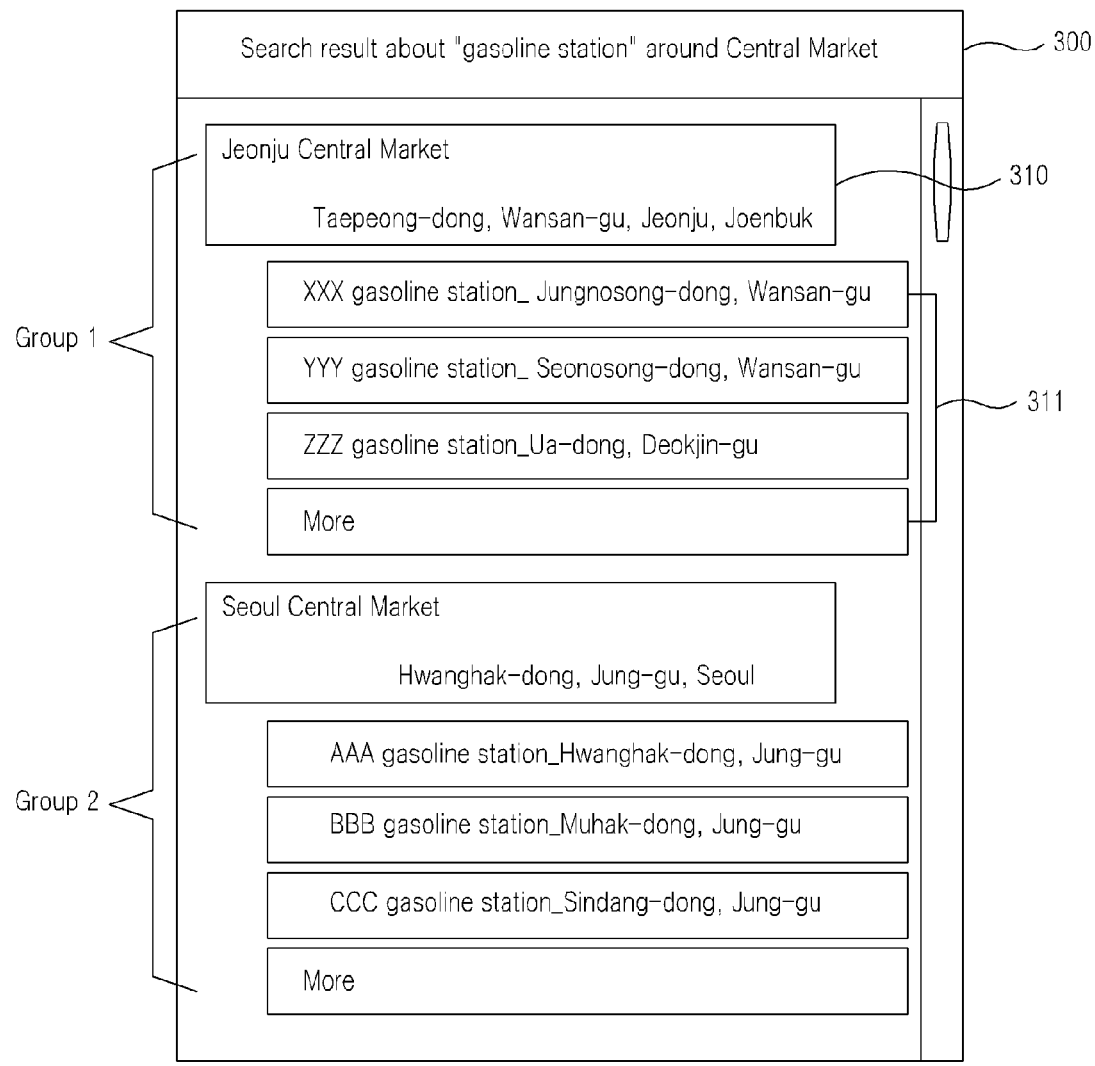
FIGS. 3 and 4 illustrate examples of a search result screen on which nearby points of interest (POIs) are grouped and thereby displayed based on each reference location according to one embodiment.

As an example, the display 230 may group and thereby display the search result about POIs into a plurality of groups based on each reference location. Referring to FIG. 3, a nearby POI list 311 corresponding to a search result about a reference location 310 is grouped as an individual group, for example, group 1, and thereby displayed on a list screen 300.

Figure 4:
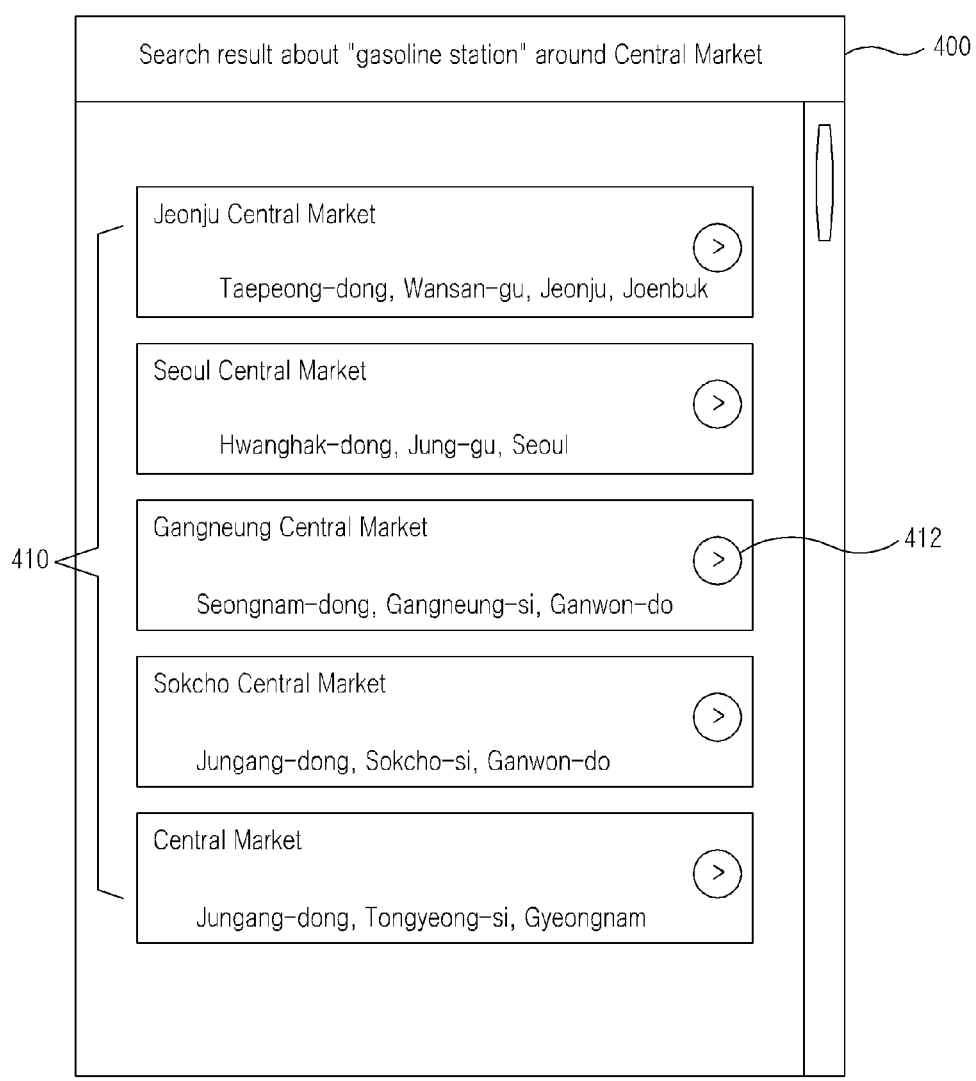

As another example, the display 230 may display a reference location list and then may display a search result list about nearby POIs of a reference location selected from the reference location list. Referring to FIG. 4, prior to providing a search result about nearby POIs, a reference location list 410 that is a POI list corresponding to a reference location may be displayed on a list screen 400. In addition, an unfold user interface (UI) 412, for example, a menu icon with a notation such as + and >, for displaying a nearby POI list with respect to a reference location at which retrieved POIs are present may be activated and displayed on the list screen 400. Accordingly, when a user selects a predetermined reference location from the reference location list 410 or selects the unfold UI 412, a nearby POI list of the selected reference location may be displayed.

In addition, when grouping and thereby displaying a search result about nearby POIs into a plurality of groups (see FIG. 3), or when displaying a reference location list (see FIG. 4), the display 230 may apply a display ranking determined based on the reference location to the search result list and thereby display the search result list.

As an example, a display ranking of a reference location may be determined based on a distance between the reference location and a current location of a user terminal having requested a nearby POI search. In other words, the display 230 may display a reference location relatively close to the current location of the user terminal on a top of a search result screen.

As another example, a display ranking of a reference location may be determined based on a weight according to a type of a POI corresponding to the reference location. For example, in the case of "Gyeongbokgung Palace", historical landmark "Gyeongbokgung Palace" and restaurant "Gyeongbokgung Palace" may be present as POIs with the same name. A different weight may be assigned to each of POIs with the same name based on a type of a corresponding POI. Accordingly, when providing a search result, the display 230 may display a reference location having a relatively high weight assigned according to a type of a POI, on a top of a search result screen.

As another example, a display ranking of a reference location may be determined based on a weight assigned according to an awareness level of a POI corresponding to the reference location. For example, in the case of "Baegyangsa Temple" located in Jangsung, Jeonnam, and "Baekyangsa Temple" located in Ulsan, the above POIs have the identical name and identical type. With respect to POIs having the identical name and identical type, a different weight may be assigned based on an awareness level of a corresponding POI. Accordingly, the display 230 may display a reference location having a relatively high weight assigned according to an awareness level of a POI, on a top of a search result screen.

When displaying a surrounding area search result obtained by the searcher 220, the display 230 may display a list screen and a map screen together as described above with reference to FIG. 1. When at least two reference locations are retrieved, the display 230 may display the map screen showing locations of nearby POIs that are retrieved based on a reference location displayed on a top or a reference location selected by a user, among the at least two reference locations.

According to the above configuration, the search system 200 may display a search result about POIs located around each reference location, so that a relationship with the corresponding reference location may be intuitively recognized.

Figure 5:
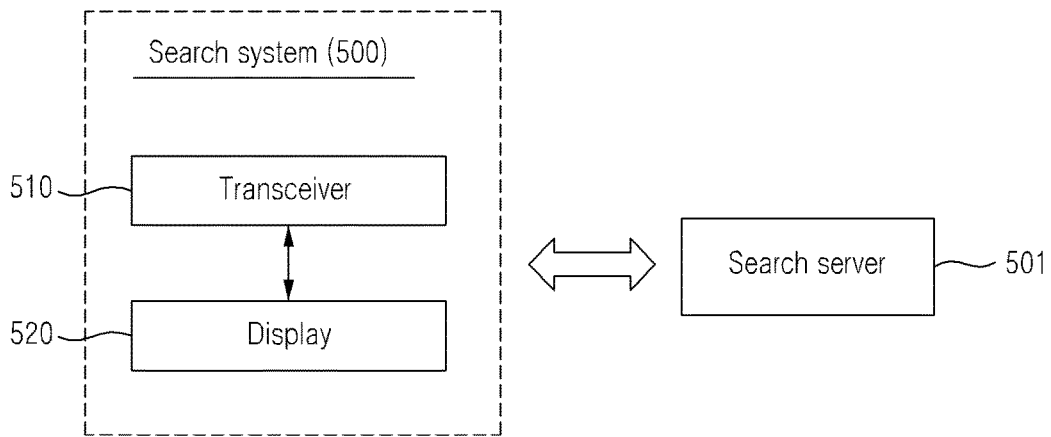
FIG. 5 is a block diagram illustrating a configuration of a search system for providing a surrounding area search result based on a plurality of reference locations according to another embodiment.

FIG. 5 is a block diagram illustrating a configuration of a search system 500 for providing a surrounding area search result based on a plurality of reference locations according to another embodiment.

Referring to FIG. 5, the search system 500 may include a transceiver 510 and a display 520. FIG. 5 may refer to a configuration of a user terminal to request a POI search through connection to a search server 501 and to display a search result provided from the search server 501 in response to the request. Here, the search server 501 corresponds to the search system 200 described above with reference to FIGS. 2 through 4 and thus, a further detailed description related thereto will be omitted.

The transceiver 510 may serve to transfer a request or an input of a user to the search server 501, and to receive a service screen or information provided from the search server 501. In particular, the transceiver 510 may transmit, to the search server 501, a nearby POI search request based on a reference location, and may receive, from the search server 501, a search result about the nearby POI search request.

The display 520 may include all the configurations for interface with the user, for example, an input device and a display device. Basically, the display 520 may display a service screen provided from the search server 501. In particular, the display 520 may display the search result about the nearby POI search request received from the search server 501. The search server 501 may search for a reference location and then search for POIs located around the reference location. When at least two reference locations are retrieved, the search server 501 may group and thereby provide the search result about the POIs into a plurality of groups based on each reference location. Accordingly, the display 520 may display a nearby POI list retrieved based on each reference location and grouped into the plurality of groups, as the search result about the nearby POI search request (see FIG. 3). In this example, a display ranking of a reference location to be displayed as the search result may be determined based on one of a distance between the reference location and a current location of a user terminal having requested the nearby POI search, a weight according to a type of a POI corresponding to the reference location, and a weight according to an awareness level of a POI corresponding to the reference location.

Figure 6:
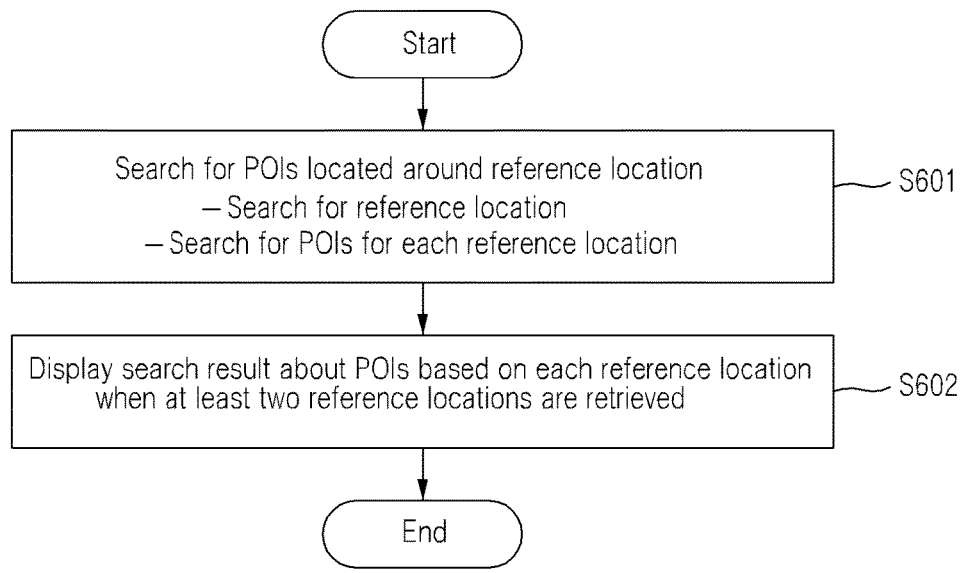
FIG. 6 is a flowchart illustrating a search method for providing a surrounding area search result based on a plurality of reference locations according to one embodiment.

FIG. 6 is a flowchart illustrating a search method for providing a surrounding area search result based on a plurality of reference locations according to an embodiment of the present invention. The search method may be performed by a search system described above with reference to FIGS. 2 through 4.

In operation S601, the search system may search for POIs located around a reference location in response to a search query. To this end, the search system may identify a keyword for searching for the reference location and may identify a keyword for searching for a POI from the search query. Accordingly, in response to a nearby POI search request based on a reference location, the search system may preferentially search for the reference location and then may search for POIs located within a predetermined distance, for example, 2 km from the retrieved reference location. When searching for a reference location using a keyword, at least two reference locations may be retrieved due to the similarity or identity between names of POIs. In the present embodiment, when at least two reference locations are retrieved, the search system may search for a nearby POI for each reference location with respect to all of the at least two reference locations, instead of selecting a single reference location.

In operation S602, the search system may display a surrounding area search result based on the reference location to be verifiable by the user. In this example, when at least two reference locations are retrieved, the search system may display, on a list screen, a search result about nearby POIs of each reference location, with respect to each reference location. As an example, the search system may group and thereby display a search result about POIs into a plurality of groups based on each reference location. That is, the search system may group and thereby display a nearby POI list corresponding to a search result about each reference location as an individual group. As another example, the search system may display a reference location list and then may display a search result list about nearby POIs of a reference location selected from the reference location list. In this example, prior to providing a search result about POIs, the search system may display a reference location list that is a POI list corresponding to the reference location, and may display a nearby POI list of a corresponding reference location when the user selects the reference location from the reference location list or selects an unfold UI from an item corresponding to the reference location.

In addition, when grouping and thereby displaying a search result about nearby POIs into a plurality of groups based on each reference location, or when displaying a reference location list, the search system may apply a display ranking determined based on the reference location to the search result list and thereby display the search result list. Here, a displaying ranking of a reference location to be displayed as the search result may be determined based on one of a distance between the reference location and a current location of a user terminal having requested a nearby POI search, a weight according to a type of a POI corresponding to the reference location, and a weight according to an awareness level of a POI corresponding to the reference location.

The search method may include further reduced operations or may include additional operations based on the detailed description of the search system made above with reference to FIG. 2 through FIG. 4. Also, at least two operations may be combined and orders or locations of operations may be changed.

Also, a search method according to another embodiment may include at least two operations based on the detailed description of the search system made above with reference to FIG. 5. In this example, the search method may include transmitting, to a search server, a nearby POI search request based on a reference location, receiving, from the search server, a search result about the nearby POI search request, and displaying the search result about the nearby POI search request. In the displaying of the search result, when at least two reference locations are retrieved, a search result about POIs may be grouped into a plurality of groups and thereby displayed based on each reference location.

The methods according to the embodiments herein may be recorded in non-transitory computer-readable storage media configured in a program instruction executable through a variety of computer systems. As an example, the embodiments may include non-transitory computer-readable storage media storing a program including searching for a reference location in response to a nearby POI search request based on the reference location, and searching for POIs located around the reference location, and displaying a search result about the POIs based on each reference location when at least two reference locations are retrieved. As another example, the embodiments may include non-transitory computer-readable storage media storing a program including transmitting, to a search server, a nearby POI search request based on a reference location, receiving, from the search server, a search result about the nearby POI search request, and displaying the search result about the nearby POI search request. Here, the search server may search for the reference location, may search for POIs located around the reference location, and may group and thereby provide the search result about the POIs into a plurality of groups based on each reference location when at least two reference locations are retrieved.

The program according to the embodiments may be configured as a PC-based program or an application exclusive for a mobile terminal. An application (app) for a map search according to the embodiments may be configured in an independently operating program or an in-app form of a predetermined application, for example, a messenger program and thereby operable on the predetermined application.

As described above, according to the embodiments herein, when a POI corresponding to a reference location is retrieved at a plurality of locations as a result of conducting a surrounding area search, the search result may be grouped into a plurality of groups based on each reference location and thereby displayed. Accordingly, when selecting a reference location, a surrounding area search may be conducted at all the reference locations without a POI omission. Accordingly, it is possible to improve the performance of a surrounding area search function of searching for a POI located around a predetermined location, for example, a reference location, and to provide a further accurate surrounding area search result.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A search system configured on one or more computers, comprising:
   a searcher included in the one or more computers configured to receive a nearby point of interest (POI) search request including a first portion associated with a reference location and a second portion associated with a POI, to search for at least two reference locations including a first reference location and a second reference location in response to the first portion, and to search for POIs located around the first reference location and the second reference location in response to the second portion; and
   a display included in the one or more computers configured to group search results into POIs located around the first reference location and POIs located around the second reference location, to separately display the POIs located around the first reference location and POIs located around the second reference location on a single search result screen,
   wherein the first reference location and second reference location represent different locations,
   wherein the display is configured to apply, to each group, a display ranking determined based on each of the at least two reference locations and display the search result, and
   wherein the display ranking of the reference location is determined based on a distance between the each of the at least two reference locations and a current location of a user terminal having requested the nearby POI search request.

2. The search system of claim 1, wherein the display ranking of the each of the at least two reference locations is determined based on a weight according to a type of a POI corresponding to the each of the at least two reference locations.

3. The search system of claim 1, wherein the display ranking of each of the at least two reference locations is determined based on a weight according to an awareness level of a POI corresponding to each of the at least two reference locations.

4. The search system of claim 1, wherein the display is configured to initially display a reference location list and to display a search result list about a POI corresponding to a reference location selected from the reference location list.

5. The search system of claim 4, wherein a display ranking of each of the at least two reference locations included in the reference location list is determined based on one of a distance between each of the at least two reference locations and a current location of a user terminal having requested the nearby POI search request, a weight according to a type of a POI corresponding to each of the at least two reference locations, and a weight according to an awareness level of the POI corresponding to each of the at least two reference locations.

6. A computer-implemented search method executed by a computer system configured to execute the search method, comprising:
   receiving, by a searcher in a computer, a nearby point of interest (POI) search request including a first portion associated with a reference location and a second portion associated with a POI,
   searching, by the searcher included in the computer system, for at least two reference locations including the first reference location and a second reference location in response to the first portion, and to search for POIs located around the first reference location and the second reference location in response to the second portion;
   grouping a search result into POIs located around the first reference location and POIs located around the second reference location; and
   separately displaying, by a display included in the computer system, the POIs located around the first reference location and POIs located around the second reference location on single search result screen;

wherein the first reference location and second reference location represent different locations, wherein displaying comprises displaying the search result into a plurality of groups based on each of the at least two reference locations, and applying, to each group, a display ranking determined based on each of the at least two reference locations and displaying the search result, and wherein the display ranking of each of the at least two reference locations is determined based on a distance between each of the at least two reference locations and a current location of a user terminal having requested a nearby POI search.

7. The search method of claim 6, wherein the displaying comprises displaying the search result into a plurality of groups based on each of the at least two reference locations.

8. The search method of claim 6, wherein the display ranking of each of the at least two reference locations is determined based on a weight according to a type of a POI corresponding to the each of the at least two reference locations.

9. The search method of claim 6, wherein the display ranking of each of the at least two reference locations is determined based on a weight according to an awareness level of a POI corresponding to the each of the at least two reference locations.

* * * * *